INVENTORS
FORREST A. NELSON
RICHARD R. ERNST

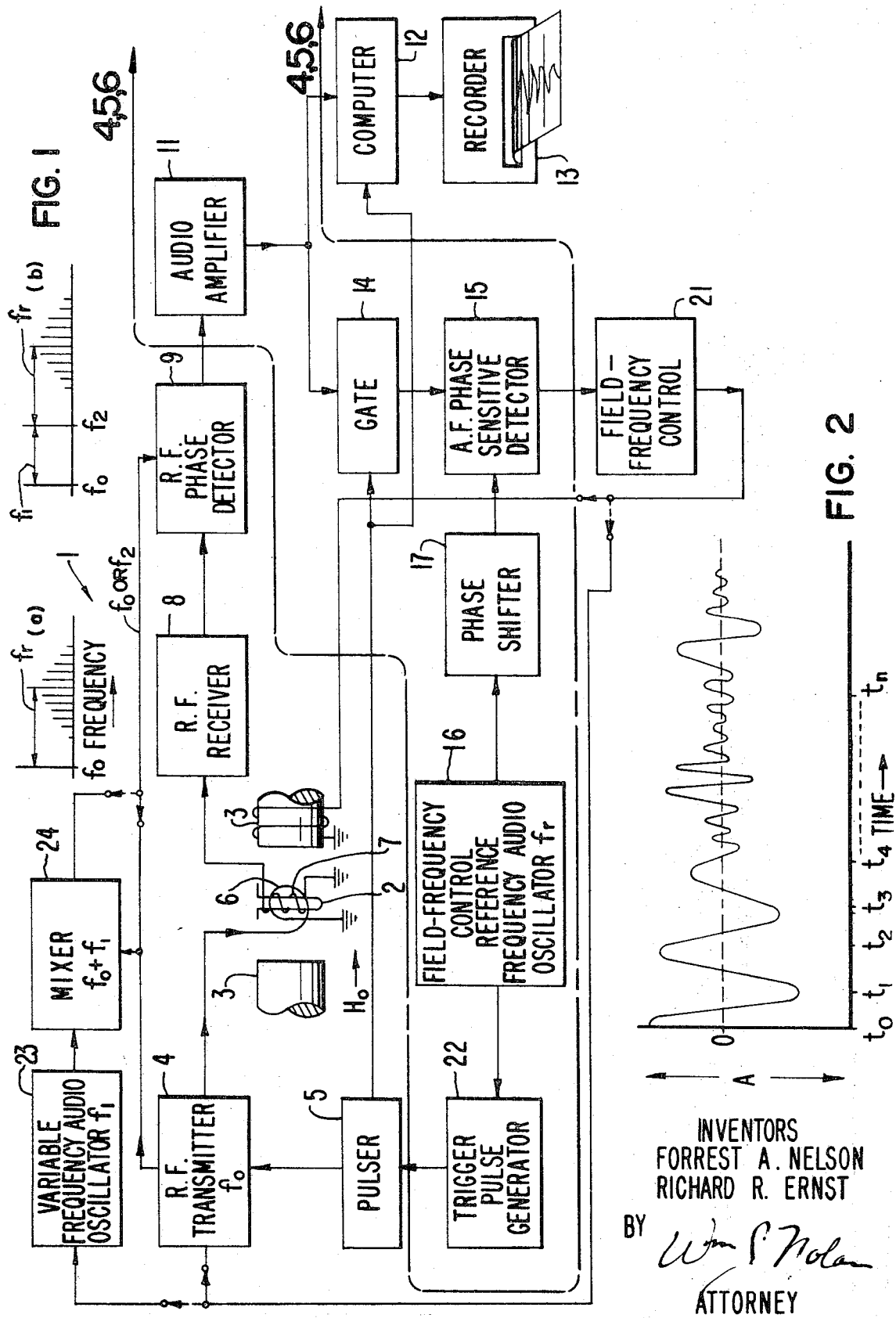

BY *Wm J Nolan*

ATTORNEY

United States Patent Office 3,530,371
Patented Sept. 22, 1970

3,530,371
INTERNAL FIELD-FREQUENCY CONTROL FOR IMPULSE GYROMAGNETIC RESONANCE SPECTROMETERS
Forrest A. Nelson, Palo Alto, Calif., and Richard R. Ernst, Winterthur, Switzerland, assignors to Varian Associates, Palo Alto, Calif., a corporation of California
Filed July 1, 1968, Ser. No. 741,496
Int. Cl. G01n 27/78
U.S. Cl. 324—.5                    11 Claims An impulse gyromagnetic resonance spectrometer is disclosed. The spectrometer includes a pulsed radio frequency transmitter for applying a train of impulses of radio frequency energy to a sample of matter disposed in a polarizing magnetic field to excite a train of transient gyromagnetic resonance signals emanating from the sample. Each transient resonant signal contains a plurality of simultaneously resonant line signals at a plurality of different frequencies corresponding to the gyromagnetic resonant lines of the sample. A receiver receives the transient resonant signals. The resonant line signals are fed to a computer which Fourier analyzes the signals to derive the separate components which are recorded. A signal, which is determinative of the frequency of one or more of the resonant lines of the sample, is derived from the resonant signal and compared with a reference quantity determinative of a certain predetermined reference polarizing magnetic field intensity or resonance detecting frequency to derive an error signal. The error signal is fed to a field-frequency controller for correcting the intensity of the polarizing field or the frequency of a reference frequency fed to the receiver to a predetermined reference intensity or frequency respectively.

In one embodiment, the reference quantity comprises a reference audio frequency which is compared in a phase sensitive detector with a transient audio frequency resonance signal correponding to one of the resonant lines of the sample to produce the error field-frequency control signal.

In another embodiment, the signal derived from the transient resonances is applied to a crystal frequency discriminator to derive the error signal.

In another embodiment, the transient resonant signal is filtered and the frequency of the filtered signal measured to derive a D.C. signal which is compared against a D.C. reference level to derive the field-frequency control error signal.

In still another embodiment, a first transient resonant signal is recorded in a memory and subsequently read out for comparison with a subsequently obtained transient resonant signal to derive the error signal.

DESCRIPTION OF THE PRIOR ART

Heretofore, impulse gyromagnetic resonance spectrometers have been proposed which employ an internal field control. More specifically, it has been proposed to include a fluorine compound, such as hexafluorobenzene, in a hydrocarbon sample as an internal field control group. Impulses of radio frequency energy of a frequency to excite simultaneous resonance of all the lines in the hydrocarbon sample are applied to the hydrocarbon sample from a transmitter to produce a train of transient composite resonance signals emanating from the hydrocarbon sample. The transient hydrocarbon resonance signals are amplified and fed to a computer for Fourier analysis, time averaging, and recording. The radio frequency transmitter energy is heterodyned with the frequency of a second R.F. transmitter to produce sideband R.F. transmitter energy at the resonance frequency of the fluorine in the fluorine compound. The sideband R.F. energy is applied for exciting resonance of the fluorine compound and is not pulsed but rather is a continuous wave signal. Continuous resonance of the fluorine is excited. The C.W. resonance signal of the fluorine field control group is compared in a phase sensitive detector with the exciting frequency of the sideband R.F. energy to produce an error signal for controlling the intensity of the magnetic field to a certain predetermined reference intensity determined by the sideband frequency applied for exciting resonance of the fluorine compound. Such a system is disclosed and claimed in copending U.S. application 459,006, filed May 26, 1965 and assigned to the same assignee as the present invention.

Although the prior art magnetic field control system is suitable for many applications there are still other applications where it is not desirable to incorporate a fluorine compound as a control group into a dissimilar compound such as the hydrocarbon compound which is to be analyzed. Also, it adds some complexity to the gyromagnetic resonance spectrometer system to produce two relatively stable transmitters at substantially different radio frequencies such as at 60 megahertz and 56.4 megahertz, respectively, as required for producing the R.F. transmitter outputs for exciting simultaneous resonance of both fluorine and the hydrocarbon compounds.

Therefore, a need exists for a simplified field-frequency control system in an impulse gyromagnetic resonance spectrometer which will avoid the use of separate sources of R.F. energy for exciting resonance of the sample under analysis and the control group.

SUMMARY OF THE PRESENT INVENTION

The principal object of the present invention is the provision of an improved field-frequency control for impulse gyromagnetic resonance spectrometers.

One feature of the present invention is the provision, in an impulse gyromagnetic resonance spectrometer, of a comparator for comparing a signal derived from the transient resonnace signals emanating from the sample under analysis of a control group against a reference quantity determinative of a certain predetermined reference gyromagnetic ratio of polarizing magnetic field intensity to resoance frequency to derive an error signal for correcting the intensity of the polarizing field or the detected resonance frequency to the certain predetermined reference intensity or frequency, respectively.

Another feature of the present invention is the same as the preceding feature wherein the comparator comprises a phase sensitive detector for comparing the phase of a reference frequency signal serving as the reference quantity against the phase of a portion of the received resonance signal to derive the error signal for controlling the magnetic field intensity or the detected resonance frequency.

Another feature of the present invention is the same as the preceding feature including the provision of a synchronizer for synchronizing the timing of the transient resonance signals with the phase of the reference frequency signal, whereby the error signal may be selected to have dispersion mode resonance characteristics.

Another feature of the present invention is the same as the preceding feature wherein means are provided for blocking a comparison of the initial portion of the received resonance signal with the reference frequency signal, whereby transient errors in the field-frequency corrective signal are prevented in use.

Another feature of the present invention is the same as any one or more of the preceding features wherein the reference frequency signal is generated by selectively reading out a previous resonance signal stored in a memory or storage device.

Another feature of the present invention is the same as the first feature wherein a counting circuit is provided for counting a narrow band portion of the transient resonant signal to derive a D.C. output signal which is compared with a reference D.C. signal to obtain the field-frequency corrective error signal.

Another feature of the present invention is the same as the first feature wherein the comparing means comprises a frequency discriminator for comparing a pair of internal reference frequencies with the signal derived from the transient resonance signal to obtain the error signal.

Another feature of the present invention is the same as any one or more of the preceding features including a memory or other storage device for storing a succession of the outputs of the comparator and a circuit for reading out and operating upon the stored output signals to derive a control signal for correcting the gyromagnetic ratio, whereby undesired drifts in the gyromagnetic ratio can be determined and corrected.

Other features and advantages of the present invention will become apparent upon a perusal of the following specification taken in connection with the accompanying drawings wherein:

BRIEF DESCRIPTION OF THE DRAWINGS

FIG. 1 is a schematic block diagram of an impulse gyromagnetic resonance spectrometer incorporating features of the present invention, FIG. 2 is a plot of one of the composite audio frequency transient resonance signals versus time.

DESCRIPTION OF THE PREFERRED EMBODIMENTS

Figure 3:
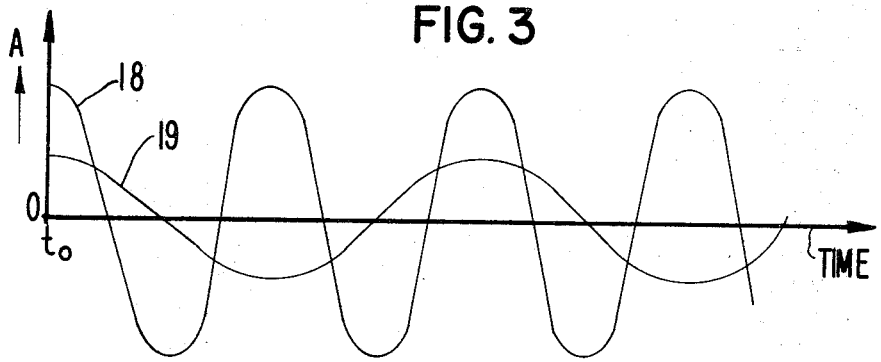
FIG. 3 is a plot of audio frequency signal amplitude versus time depicting first and second separate transient Fourier resonance signal components.

Referring now to FIG. 1, there is shown an impulse gyromagnetic resonance spectrometer 1 incorporating features of the present invention. The spectrometer 1 includes a sample vial 2 containing a sample of matter under analysis, for example, a hydrocarbon compound. A reference control group of gyromagnetic bodies such as the protons in tetramethyl silane (TMS) is preferably intermixed with the sample to be analyzed. If desired the sample of matter under analysis can also be used as the control. The sample 2 is disposed in a polarizing D.C. magnetic field $H_0$ produced between the poles of a powerful electromagnet 3, only partially shown.

A radio frequency transmitter 4, as controlled by a pulser 5, supplies a train of radio frequency energy impulses to the sample 2 via a transmitter coil 6 oriented at right angles to the direction of the polarizing magnetic field $H_0$. The frequency F.O. of the radio frequency transmitter 4 is preferably selected to be near to but slightly off the end frequency of the gyromagnetic resonance spectrum of the sample contained within the vial 2 to be analyzed. (See spectrums (a) and (b) of FIG. 1). In a typical example, the frequency F.O. of the R.F. transmitter 4 is approximately 60 megahertz and the intensity of the polarizing magnetic field $H_0$ is selected to place the 60 megahertz signal off the end of the resonance spectrum of the sample to be analyzed.

The impulses of radio frequency energy are sufficiently short in duration, for example, 50 microseconds and the pulse repetition frequency is sufficiently low, for example, 1 hertz to produce a relatively wide spectrum of closely spaced radio frequency energy Fourier components in the sample 2 under analysis. For example, with a repetition frequency of 1 hertz Fourier frequency components are produced on both sides of the carrier and with a pulse duration of approximately 50, such sideband frequencies extend with equal amplitudes over a relatively wide band for exciting simultaneous resonance of substantially all of the resonance lines within the sample 2 to be analyzed.

The train of transmitter pulses produces a corresponding train of resonance signals emanating from the sample under analysis. Each of the resonance signals in the train of resonance signals comprises a transient signal containing simultaneous Fourier transient components corresponding to the separate excited resonance lines of the sample under analysis. A receiver coil 7 is wound around the vial 2 for receiving the resonance signals emanating from the sample under analysis. The resonance signals are fed to the input of a radio frequency receiver 8 wherein they are amplified and thence fed to one input of a radio frequency phase detector 9 for comparison with a C.W. sample F.O. of the transmitted radio frequency energy for translating the transient exponentially decaying resonance signals to the audio frequency range.

The audio frequency resonance signals are fed to an audio amplifier 11 wherein they are amplified and thence fed to a computer 12 which samples each of the transient resonance signals at a number of predetermined times ($t_1$, $t_2$, $t_3$ . . . $tn$) starting from the beginning $t_0$ of each transient resonance signal. (See FIG. 2). The sample bits are stored in separate channels in a memory and added together in the separate channels to cancel random noise components therein and to obtain an improved signal-to-noise ratio. The computer is programmed to Fourier analyze the stored signal information and to separate the composite resonance signal into its separate Fourier resonant line components for recording in a recorder 13 to yield a recording of the gyromagnetic resonance spectrum of the sample under analysis. Such a computer and recorder is described in the aforecited U.S. application 459,006.

A second portion of the transient audio frequency resonance signal in the output of audio amplifier 11, is employed for deriving a field frequency control signal. More specifically, a portion of the output of audio amplifier 11 is fed via a gate 14 to one input of a phase sensitive detector 15. An audio reference frequency signal $f_r$ is fed to the other input of the phase sensitive detector 15 from a field-frequency control reference frequency audio oscillator 16 via an adjustable phase shifter 17. The audio reference frequency signal of audio oscillator 16 is set to a frequency $f_r$ corresponding to an audio frequency of one of the resonance line components in the transient resonance signal obtained from the output of audio amplifier 11. More particularly, each transient resonance signal emanating from the sample, and as appearing in the output of audio amplifier 11 and as shown in FIG. 2, includes a plurality of simultaneous resonance Fourier components as indicated by signals 18 and 19 of FIG. 3.

One of these resonant line components is selected as the control line for controlling the gyromagnetic ratio of the intensity of the polarizing magnetic field $H_0$ to the reference frequency derived from the transmitter 4 and fed to the R.F. phase detector 9. Typically, the operator will select a relatively strong resonance line of the spectrum of the sample under analysis or alternatively he will select a strong line of a control compound introduced into the sample for control purposes, for example, the proton line in (TMS). The reference frequency $f_r$ of the audio oscillator 16 is set to the audio frequency of the control line, for example, to the frequency of line 18 of FIG. 3. The audio frequency phase sensitive detector 15 then compares the phase of the resonance line component selected as the control with the phase of the audio frequency reference signal $f_r$ and the output of the audio phase sensitive detector 15 is a time varying D.C. control signal having a sense and amplitude corresponding to any tendencies for the gyromagnetic ratio of polarizing magnetic field intensity $H_0$ to the R.F. frequency of the reference signal fed to the R.F. phase detector 9 to depart from the predetermined ratio as determined by the reference frequency $f_r$ of the audio oscillator 16. The phase shifter 17 is adjusted to produce operation on the dispersion resonance mode of the control resonance line 18. The D.C. error signal in the output of the audio phase sensitive detector 15 is fed to a field-frequency control 21 such as power amplifier for correcting either the intensity of the polarizing magnetic field $H_0$ by feeding a suitable current to the windings of the electromagnet 3 or the frequency of the reference fed to the input of R.F. phase detector 9 by tuning the frequency of transmitter 4.

As an alternative to tuning the frequency $f_0$ of transmitter, a tunable sideband $f_2$ of the transmitter $f_0$ may be employed as the reference input frequency to the R.F. phase detector 9. More specifically, the error signal output of the field-frequency control 21 is switched to bypass the R.F. transmitter 4 and to tune the frequency $f_1$ a variable frequency audio oscillator 23 the output of which is heterodyned in a mixer 24 with a sample of the transmitter signal $f_0$ to produce a tunable sideband $f_2=(f_0+f_1)$. The tunable sideband $f_2$ is fed to the reference input of the radio frequency phase detector 9. The frequency $f_1$ of the audio oscillator is tuned by the field-frequency control signal to maintain a constant difference frequency $f_r$ between the tunable sideband reference frequency $f_2$ and the frequency of the control resonance line.

In order to observe a substantially pure dispersion mode of the control resonance line 18, it is necessary to synchronize the starting time $t_0$ of the free precession resonance signal with the phase of the field control reference audio signal. This synchronization is obtained by feeding a portion of the reference audio frequency signal to a trigger pulse generator 22 which shapes and differentiates the reference signal to obtain a train of trigger pulses, there being one trigger pulse per cycle of the reference audio frequency. The train of trigger pulses are fed to the pulser 5 such that the radio frequency transmitter pulses, when they occur, are synchronized in time with a certain phase of the reference audio frequency. Since the transmitter pulses have a predetermined length, as of 50μs., the time of the transmitter pulse is thus synchronized in a certain phase relation with reference audio frequency. Since the time of the transmitter pulse is synchronized with the reference audio frequency, so too is the starting time $t_0$ of the transient resonance signals emanating from the sample under analysis and/or separate control group.

The phase shifter 17, which may alternatively be located in reference input line to R.F. phase detector 9, is adjusted such that the phase relation between the reference audio frequency $f_r$ and the control Fourier component of the resonance signal are such as to produce a desired dispersion mode resonance output in the audio phase sensitive detector 15. As an alternative to the use of a phase shifter 17, the relative phase difference between the two inputs to the phase sensitive detector 15 may be adjusted by means of an adjustable time delay, not shown, which may delay the trigger pulses to the pulser 5 or which may delay the reference frequency signal to the phase sensitive detector 15.

By reference to FIG. 3, it is seen that at the starting time $t_0$ of the transient resonance signals all of the Fourier components having different frequencies within the resonance signal have the same phase. Thus, there will be a transient error signal produced in the output of the phase sensitive detector 15 if the initial part of the transient signal is employed for field-frequency control due to the in-phase addition of all the separate initially in-phase components. Accordingly, a signal is derived from the pulser 5 for gating off the initial portion of the transient resonance signal as fed to the one input of the phase sensitive detector 15. In this manner, the transient error signal is eliminated which would be produced at the beginning of the transient resonance signal. A sample of the pulser output is also fed to the computer 12 for synchronizing the computer with the transient resonance signals.

Figure 4:
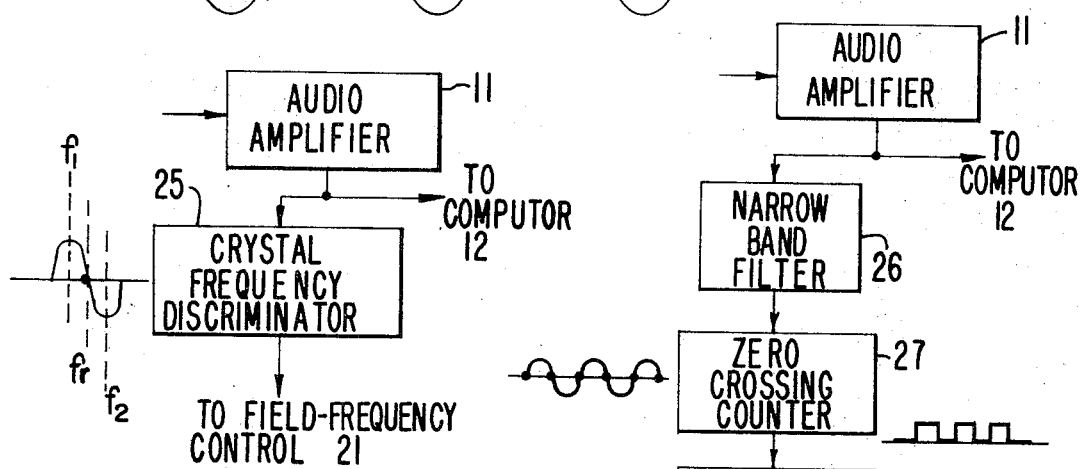
FIGS. 4–7 are schematic block diagrams for alternative portions of the circuit of FIG. 1, delineated by lines 4, 5, 6, 7—4, 5, 6, 7.

Referring now to FIG. 4, there is shown an alternative field-frequency control portion of the circuit of FIG. 1. In this embodiment, a portion of the output of audio amplifier 11 is fed to one input of a crystal frequency discriminator 25 to derive the phase sensitive output for field-frequency control. The crystal frequency discriminator 25 includes two resonant circuits which are tuned to frequencies which are close to each other. More specifically, the two crystals are tuned to frequencies $f_2$ and $f_1$ which are equally spaced in frequency above and below a field control reference frequency $f_r$ and are connected to detectors whose output are subtractive. Any departure in the frequency of the control line 18 from the predetermined control frequency $f_r$ produces the D.C. error signal for controlling the magnetic field.

Figure 5:
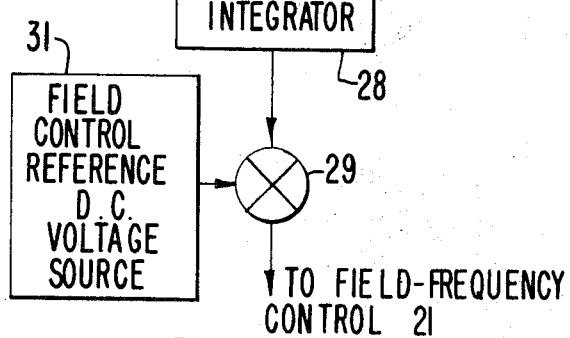

Referring now to FIG. 5, there is shown an alternative field-frequency control circuit portion of the spectrometer of FIG. 1. In this embodiment, a portion of the transient audio frequency resonance signal in the output of audio amplifier 11 is fed to a narrow band filter 26. The narrow band filter is tuned for a desired control frequency, for example, it is tuned for $f_r$ corresponding to the frequency of control line 18 of FIG. 3. The filter 26 has a relatively narrow band as of 1 hertz. The desired control frequency passes through the narrow band filter 26 to a zero crossing counter 27 which counts the number of times the control line signal passes through zero amplitude in a predetermined interval of time to produce a train of D.C. pulses of fixed height and duration, the number of pulses of the train corresponding to the count in the predetermined interval of time. The pulses are fed to an integrator 28 which integrates the pulses to produce a D.C. signal having an amplitude corresponding to the frequency of the control line. The output of integrator 28 is fed to an error detector 29 and compared with a D.C. reference voltage obtained from a field-frequency control reference D.C. voltage source 31 to produce the field-frequency control error signal for controlling the gyromagnetic ratio of the intensity of the polarizing magnetic field $H_0$ to the reference frequency ($f_0$ or $f_2$) input to phase detector 9.

In an alternative method, the narrow band filter 26 is eliminated and the total number of zero crossings in a fixed time interval is determined by the zero crossing counter 27. A voltage proportional to the count can then be stored in integrator 28 and used as before to derive the field-frequency control signal.

Figure 6:
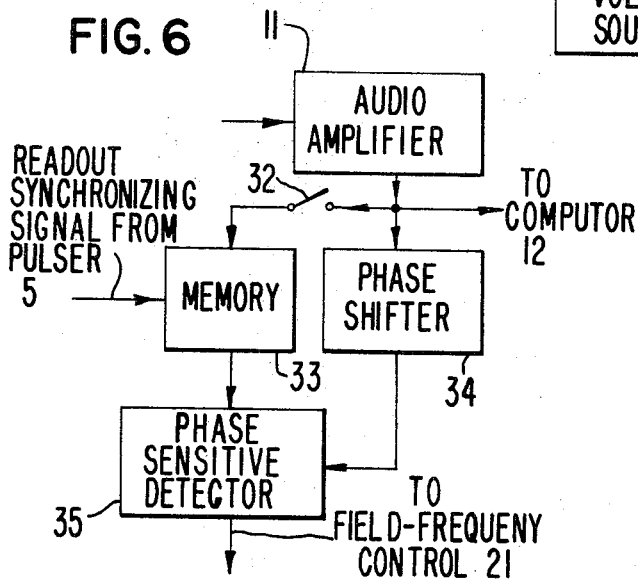

Referring now to FIG. 6, there is shown an alternative field-frequency control circuit portion of the system of FIG. 1. In this embodiment, a first transient resonance signal obtained in the output of audio amplifier 11 is switched via switch 32 into a memory 33 for recording. After the first transient signal is recorded in the memory 33, switch 32 is opened and subsequent transient resonance signals are fed via phase shifter 34 to one input of a phase sensitive detector 35. A readout synchronizing signal is derived from the pulser 5 for causing the stored transient signal in the memory 33 to be read out into the other input of the phase sensitive detector 35 for comparison with the second transient resonance signal. The phase shifter 34 is adjusted to observe the dispersion resonance mode. If the gyromagnetic ratio of the polarizing magnetic field intensity to the reference frequency $f_0$ or $f_2$ has shifted during the time interval between the recording of the first resonance signal and the subsequent transient resonance signal used for comparison, a D.C. error signal will be obtained in the output of the phase sensitive detector 35 which is fed to the field-frequency control 21 for controlling the gyromagnetic ratio to the predetermined value as determined by the signal stored in the memory 33. The signal stored in the memory is repetitively read out for comparison with subsequent resonance signals for field-frequency control.

Figure 7:
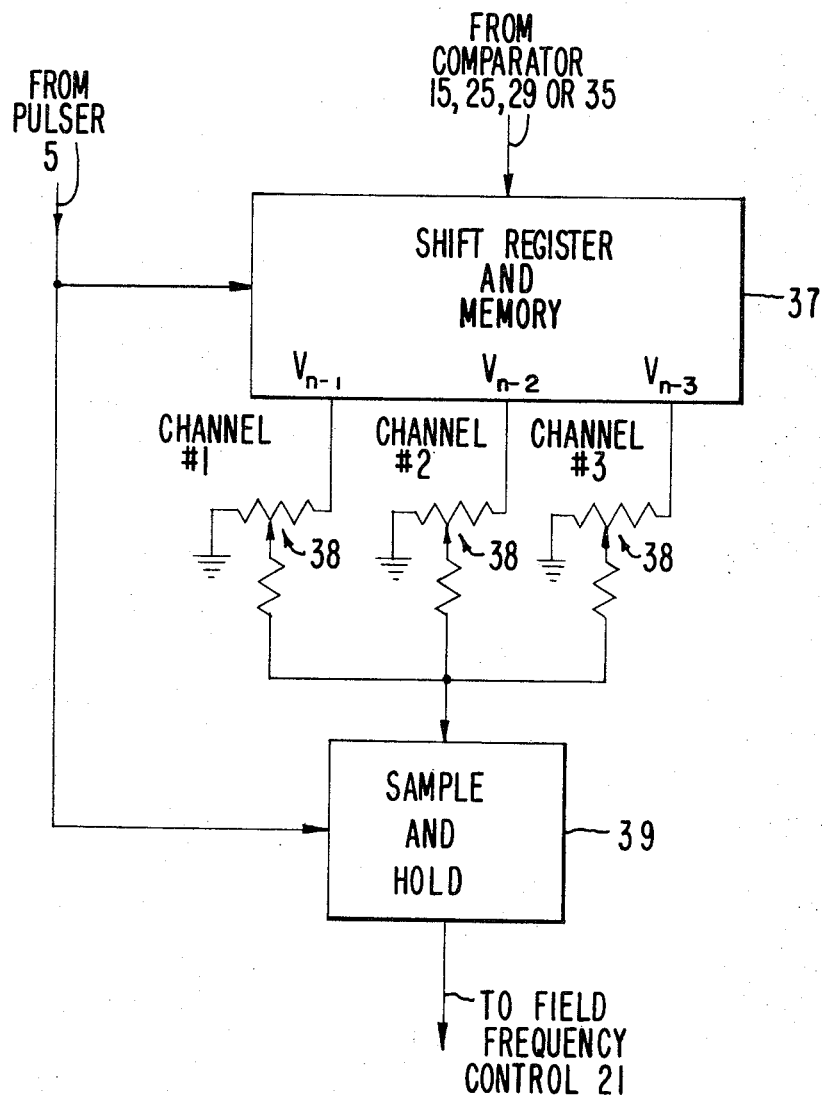

Referring now to FIG. 7 there is shown a circuit which operates upon the control signal, as derived from the output of any one of the previously described comparators 15, 25, 29 or 35, to predict and derive a more correct control signal to be used in the previous manner as described in FIGS. 1 and 4–6. This more correct control signal may comprise an average of previous control signals and may include a rate of change correction to predict and cancel long term drift of the gyromagnetic ratio.

More specifically, the most recent output signal $Vn-1$ from the comparator 15, 25, 29 or 35 is averaged and stored in channel number 1 of the memory or other storage element of shift register type memory 37 or other memory unit. The averaged output signal $Vn-2$ from the preceding pulse is stored in channel number 2 and similarly for channel number 3, etc. The field frequency control signal is derived from the stored signals as a linear combination of those stored voltages so as to correct for monotonic changes (drifts) in the gyromagnetic ratio. The proper ratio of the outputs from channels 1, 2, 3 ... $n$ are selected by the settings of potentiometers 38. The field-frequency corrective output signal derived as the combination of the various channels is held constant by a sample and hold circuit 39, during the time the spectrometer scans through a spectrum under analysis or during the time resonance data is being obtained. The shift register and memory 37 and sample and hold circuit 39 are synchronized by signals derived from the pulser 5.

The field-frequency control circuits above described are applicable in general to resonance spectrometers and are not specifically limited to nuclear resonance spectrometers. More specifically the above field-frequency control circuits are applicable to field and/or frequency control in electron spin resonance, nuclear quadrupole resonance, ferromagnetic resonance in ferromagnetic materials, magnetic resonance in molecular beams, electric resonance in molecular beams, and ion cyclotron resonance.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an impulse gyromagnetic resonance spectrometer, means for applying a train of impulses of energy to a sample of matter disposed in a polarizing magnetic field to excite a train of transient gyromagnetic resonance signals from the the sample, each transient resonance signal containing a plurality of simultaneous resonance line signals, means for simultaneously receiving a plurality of transient gyromagnetic resonance line signals at a plurality of different frequencies emanating from the sample of matter. The improvement comprising, means for comparing a resonance line signal derived from the received transient resonance signals with a reference signal representative of a reference gyromagnetic ratio of polarizing magnetic field intensity to a reference frequency to derive an error signal representative of changes in the spectrometer gyromagnetic ratio, if any, relative to the reference gyromagnetic ratio, and means responsive to the error signal for correcting the gyromagnetic ratio of the spectrometer to the reference value.

2. The apparatus of claim 1 wherein said means for comparing the signal derived from the received transient resonance signal with a reference quantity to derive the error signal includes, means for generating a reference frequency signal serving as the reference quantity, and a phase sensitive detector for phase sensitively comparing the received resonance signal with the reference frequency signal to derive the error signal.

3. The apparatus of claim 2 including means for synchronizing the timing of the resonance exciting impulses of energy with the phase of the reference requency signal, whereby the error signal may be selected to have substantially a pure dispersion mode resonance characteristics.

4. The apparatus of claim 3 wherein said means for generating the reference frequency signal is an audio frequency signal generator.

5. The apparatus of claim 4 wherein said means for synchronizing the timing of the impulses of exciting radio frequency energy with the phase of the reference frequency signal includes means operative upon the reference frequency signal to derive a train of trigger pulses, and means for applying the trigger pulses to said means for applying the resonance exciting pulses of energy to the sample to control timing of the resonance exciting impulses of energy.

6. The apparatus of claim 1 including means for filtering the received resonance signals to select a relatively narrow band signal portion therefrom, means for detecting the narrow band signal to derive a D.C. output signal having an amplitude representative of the gyromagnetic ratio, means for deriving a reference D.C. signal having an amplitude representative of a predetermined gyromagnetic ratio, the D.C. signals being compared in said comparing means to derive the error signal for correcting the gyomagnetic ratio.

7. The apparatus of claim 1 wherein said comparing means comprises a pair of closely tuned resonators, a frequency discriminator for comparing the reference frequencies of said tuned resonators and serving as the reference quantity with the frequency of one of the gyromagnetic resonance frequency components of the received resonance signal to derive the error signal for correcting the gyromagnetic ratio.

8. The apparatus of claim 2 wherein said means for generating the reference frequency signal serving as the reference quantity comprises a signal storage means for storing a received resonance signal, and means for selectively reading out the stored resonance signal to produce the reference frequency signal for comparison in said phase sensitive detecting means with a subsequently received resonance signal.

9. The apparatus of claim 2 including means for blocking comparison in said phase sensitive detector of the initial portion of the received resonance signal with the reference frequency signal, whereby transient errors in the gyromagnetic ration corrective signal are prevented in use.

10. The apparatus of claim 2 including means for adjusting the phase difference between the phase of the reference signal and the phase of the resonance signal as compared in said phase sensitive detecting means.

11. The apparatus of claim 1 wherein said means responsive to the error signal for correcting the gyromagnetic ratio includes, means forming a storage unit for storing successively obtained error signals, means operative upon stored error signals to derive an error signal comprising a combination of the stored error signals to derive a second error signal for correcting the gyromagnetic ratio to the reference value.

References Cited

UNITED STATES PATENTS

| | | | |
|---|---|---|---|
| 3,358,222 | 12/1967 | Hyde | 324—1.5 |
| 3,461,381 | 8/1969 | Nelson | 324—1.5 |

RUDOLPH V. ROLINEC, Primary Examiner

M. J. LYNCH, Assistant Examiner